United States Patent
Chrosziel

[11] Patent Number: 5,678,108
[45] Date of Patent: Oct. 14, 1997

[54] MATTEBOX FOR CAMERA LENSES

[75] Inventor: Alfred Chrosziel, Ismaning, Germany

[73] Assignee: Filmtechnik Alfred Chrosziel GmbH, Munich, Germany

[21] Appl. No.: 681,097

[22] Filed: Jul. 22, 1996

Related U.S. Application Data

[63] Continuation of Ser. No. 229,293, Apr. 18, 1994, abandoned.

[30] Foreign Application Priority Data

Apr. 19, 1993 [DE] Germany .................... 43 12 654.5

[51] Int. Cl.$^6$ .................................................. G03B 11/00
[52] U.S. Cl. ................................... 396/530; 396/545
[58] Field of Search ................... 354/295, 296, 354/287, 159, 94, 189, 192, 195.12; 396/342, 530, 435, 544, 545

[56] References Cited

U.S. PATENT DOCUMENTS

| | | | |
|---|---|---|---|
| 3,812,509 | 5/1974 | Wostphalgh | 354/195 |
| 5,086,311 | 2/1992 | Nara et al. | 354/195.1 |
| 5,223,889 | 6/1993 | Mouner | 355/43 |
| 5,258,790 | 11/1993 | Tanaka | 354/94 |
| 5,294,954 | 3/1994 | Nomura et al. | 354/287 |
| 5,345,285 | 9/1994 | Hasushita et al. | 354/159 |
| 5,489,958 | 2/1996 | Katagiri et al. | 354/195.12 |

*Primary Examiner*—Safet Metjahic
*Assistant Examiner*—Nicholas J. Tuccillo
*Attorney, Agent, or Firm*—Davis and Bujold

[57] ABSTRACT

In the proposed gobo (11), the diaphragm mask (13) is placed on a stationary surface, especially of a planar member, and has an aperture (27) of the gobo substantially adjustable along the stationary surface or planar member according to the focal length used. The diaphragm mask has two curtains (15, 16), preferably adjustable in pairs in opposite directions, which limit the free aperture of the gobo depending on the focal length used. The curtains are adjusted by electromotors (M1, M2) via belts (19, 21), rollers (20, 22), and bevel gears (25, 26). The motors (M1, M2) are controlled by a controller (28) and, via potentiometer readings, receive as input signals the adjustment values of the lens for focal length and focus.

12 Claims, 3 Drawing Sheets

MATTEBOX FOR CAMERA LENSES

This application is a continuation of application Ser. No. 08/229,293 filed on Apr. 18, 1994 now abandoned.

FIELD OF THE INVENTION

This invention relates to gobos for camera lenses, and more particularly to gobos for video and film cameras.

BACKGROUND OF THE INVENTION

German Patent 31 06 636 has disclosed a gobo, especially for video and film cameras, wherein the image angle of the gobo and the focal length of the lens are adjustable. For this purpose, a diaphragm mask that limits the angle of light leakage and is axially movable is placed before the lens within a stationary diaphragm tube abutting the lens. The diaphragm mask can be connected to the adjusting mechanism for the focal length of the lens by a gear drive and bevel gearing, so that when the focal length is manually adjusted, the diaphragm mask of the gobo is axially moved within the diaphragm tube and thus adapted to the image field of the camera existing at that moment. This gobo has proven satisfactory in practice.

Such gobos are necessary, even today, despite the most modern manifold improvements of zoom lenses. The gobo must suppress or reduce the so-called ghost images that originate from spots or light sources outside the image field reproduced by the lens and which are produced by internal reflections off objects such as the diaphragm (iris) as so-called diaphragm flaws. Between the lens and the beam-distributing prism of modern electronic video cameras, additional reflections which can also manifest themselves chromatically (blue/green/red) may appear. In the present zoom lenses, adjustable over a wide focal length range, numerous glass-air interfaces appear, especially in the high zoom range of from 1 to 55, as desired at present, whereby the production of such ghost images is further encouraged.

In single camera adjustments these ghost images can still be prevented with relative ease. However, in multiple camera operation, especially in the studio, the freedom of design of the electrician cameraman is considerably impaired.

The gobos known already, of course, offer only an adaptation to the image field of the camera lens for relatively small zoom ranges of from 2.5:1. Since at present, as already said, camera lenses are used where the ratio from the shortest to the longest focal length amounts to 1 to 50 and more, with said known gobo, assuming a reasonable model, the image field can no longer be screened in accordance with the focal length used. Furthermore, the mechanical linkage between the setting ring for the focal length and the diaphragm mask ensures no exact screening of the actual image field of the lens, since no exact linear relationship exists between the rotary position of the focal length ring and the axial position of the diaphragm mask. The screening of the lens is thus imperfect.

In addition, generally in modern zoom lenses focusing sharply is accompanied by an adjustment of the focal length, that is, the image angle of the lens changes, even if slightly, when focusing sharply. The prior art also has not provided for such a fine tuning of the image angle of the gobo when focusing sharply.

SUMMARY OF THE INVENTION

The problem to be solved by the invention is to provide a gobo where the aperture of the gobo can be precisely adjusted in accordance with the focal length or image angle used, even for zoom lenses having a large focal length ratio. Therefore, an exact linkage is needed between the adjustment of the lens and the adjustment of the gobo.

This problem is solved by a gobo for screening the image field of a lens of one of a video and film camera against ghost images, whereby the image field of the lens is defined by the focal length of the lens, the gobo comprising a diaphragm mask being placed in front of the lens and having a free aperture, the diaphragm mask with the aperture being adjustable so that the aperture angle of the gobo is in relation to the image field of the lens to block light incident from light sources out of the image field of the lens, wherein the diaphragm mask is arranged substantially in a stationary plane perpendicular to the optical axis of the lens and has an aperture adjustable substantially within the plane in relation to the focal length used, and an adjusting device is provided to adjust the size of the aperture of the diaphragm mask in relation to the focal length used.

A simple solution is to adjust the aperture of the gobo in accordance with the focal length used, substantially in a stationary plane perpendicular to the axis of the lens, through two movable curtains that run horizontally and vertically. This can be done with a single motor, the individual curtains then being coupled with each other by forced controls and gearing or with several motors adequately controlled. The picture ratio of the aperture of the gobo, depending on the focal length used in the vertical and the horizontal directions, is accordingly adapted to the format of the corresponding reproduction format such as 1.33:1, etc. With such a design of the gobo, the image field of the lens can be easily protected from sources of glare even for focal length ratios of 50 to 1 and more, since the gobo's aperture can, in principle, be adjusted from an extremely wide angle adjustment to an extremely distant adjustment in accordance with the focal length used. Bellows or window shades, placed substantially along a plane, can be used as curtains. Likewise conceivable are optoelectric curtains. For this purpose, an optoelectronic filter is placed on the front side of the gobo, consisting of a multiplicity of optoelectric cells arranged as a matrix which, by electric control signals, can be shifted to transparent or opaque so that the desired free aperture of the gobo is formed, depending on the focal length used, through the cells which have been shifted from opaque to transparent. Other structures are also possible such as a diaphragm in the form of a cone to be varied in its image angle whereby the image field of the lens can likewise be screened for a large focal length ratio. With studio illumination, such a diaphragm can be obtained, for instance, by several diaphragm shutters similar to light gates or French flags, and it is also possible to design the diaphragm shutters as bellows.

In motor-driven gobos, the motors are controlled according to the focal length and optionally also to the focus, these values being read via potentiometers present in the zoom lenses of professional video cameras for monitoring the electronically servocontrolled adjustment of the focal length and the focus.

An electronically regulated servocontrol is provided for the gobo which can also be programmably designed. By a control characteristic, the servocontrol provides adjustment of the aperture of the gobo, depending on the focal length used in relation to the actual focal length and focus, so that an optimal limitation of the image field of the lens is always given. By virtue of the programmability, the gobo can be tuned, for instance, to the picture ratio used according to the photograph and reproduction size, e.g. 1.33:1, etc.

It is a further advantage to provide the gobo, especially on the top side thereof, with a horizontally movable diaphragm shutter or French flag which is likewise adjusted according to the focal length and the focus.

With the indicated structure of the gobo, it is possible to reliably eliminate glare sources which are not suppressed by other structures, especially in an active studio having, as a rule, a large number of studio lights in a multiplicity of positions with regard to the respective cameras.

DESCRIPTION OF THE PREFERRED EMBODIMENTS

A servocontrol for zoom and focus is generally made available as a standard item by a lens manufacturer so that the zooming gobo takes only the available signal concerning focal length adjustment or focus and produces therefrom the signal for the adjustment of change of the gobo synchronously with a change in focus and focal length.

Figure 1:
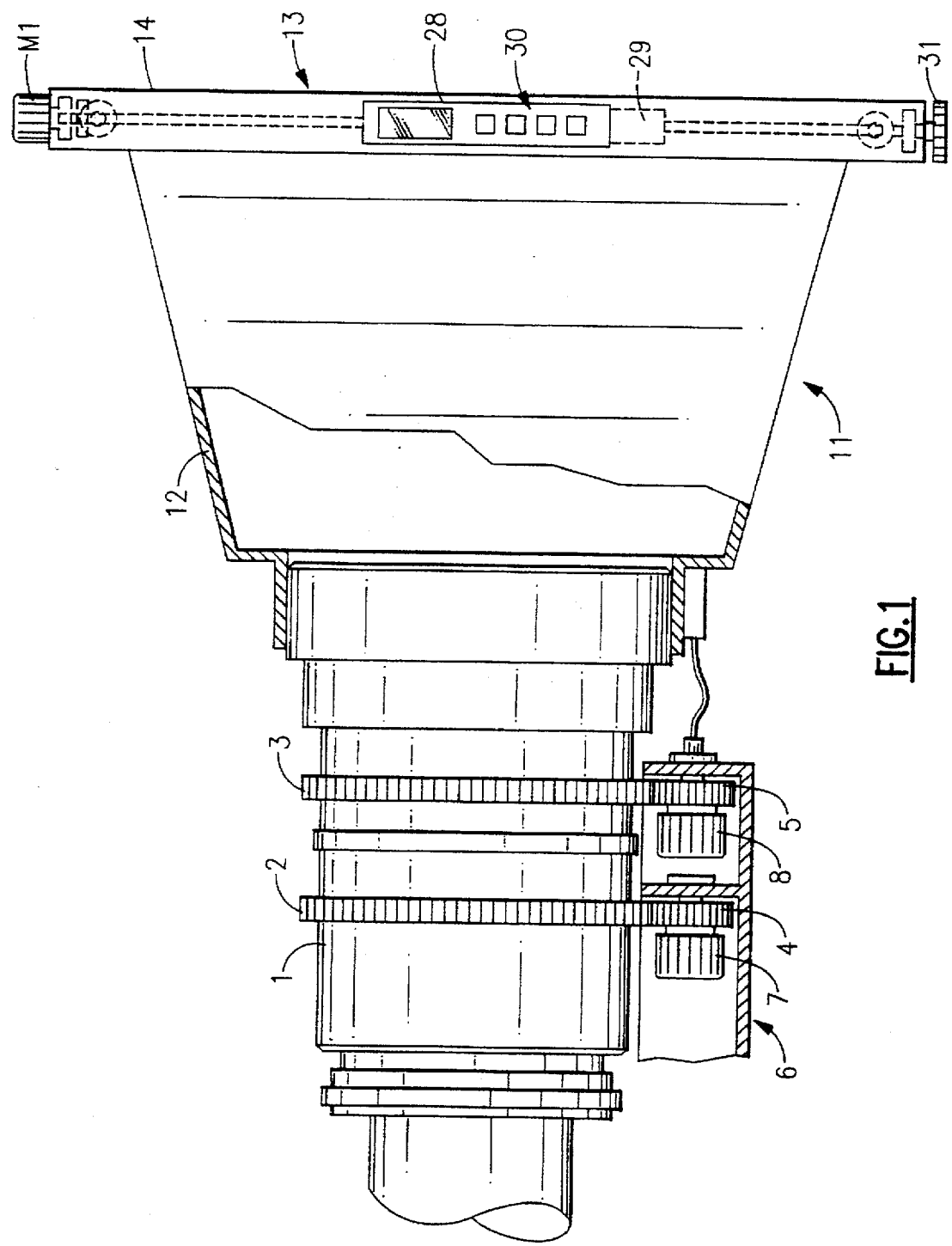
FIG. 1 is a diagrammatic top view of a lens of a camera having a proposed gobo according to the invention.

In FIG. 1, a zoom lens of a video camera is designated with a 1, a focal length ring, for adjusting the focal length, with a 2 and a ring for adjusting the focus with a 3. The setting rings 2 and 3 are designed as toothed wheels in which corresponding toothed wheels 4 and 5, of a motor unit 6 screwed on the lens 1, mesh. The focal length and the focus can be remotely controlled by a motor, the rotation of the rings 2 and 3 being read via corresponding potentiometers 7 and 8, on the shafts of the toothed wheels 4 and 5 of the motor unit 6, and transmitted to the remote control for adjustment of the zoom lens 1.

Figure 2:
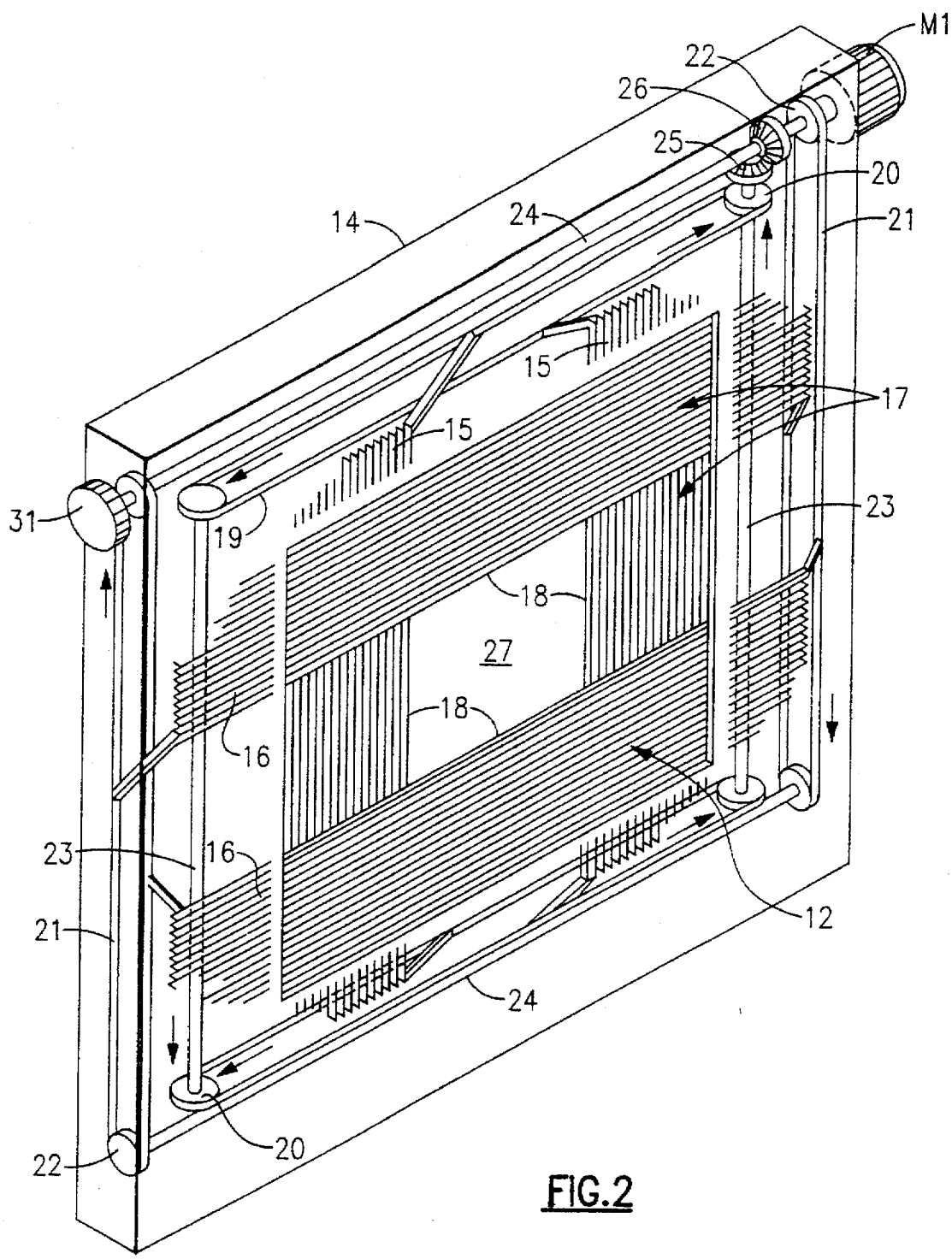
FIG. 2 is a front view of the gobo according to the invention.

On the front end of the zoom lens 1 is superposed a 11 which has a housing 12 open to the front with four sidewalls expanding in the manner of a frustrum, and a diaphragm mask 13 on the front end of the housing 12. Said diaphragm mask 13 has a perimeter frame 14 in which two horizontally and vertically movable curtains (window shades) 15 and 16 are placed, see FIG. 2, which are respectively designed as flat bellows 17 having front edges, respectively, reinforced with an aluminum strip 18.

The horizontally adjustable flat bellows 15 are adjusted by means of belts 19, which are located in upper and lower portions of the frame 14, and are guided over corresponding rollers 20. The bellows 16, which are vertically adjustable, are adjusted via corresponding vertical belts 21 and rollers 22. Rollers 20 and 22 are interconnected by axles 23 and 24, with bevel gears 25 and 26, respectively, being fastened on each one of the axles 23 and 24 and both bevel gears 25 and 26 meshing with each other. The axles 23 and 24 thus rotate synchronously, with the flat bellows 15 and 16 opening or closing to create a picture ratio determined by the gear ratio of the bevel gears 25 and 26. Depending on the position of the bellows 15 and 16, a free image angle, the picture ratio of which is exactly adapted to that of an image or a reproduction format used, results.

Figures 3, 4:
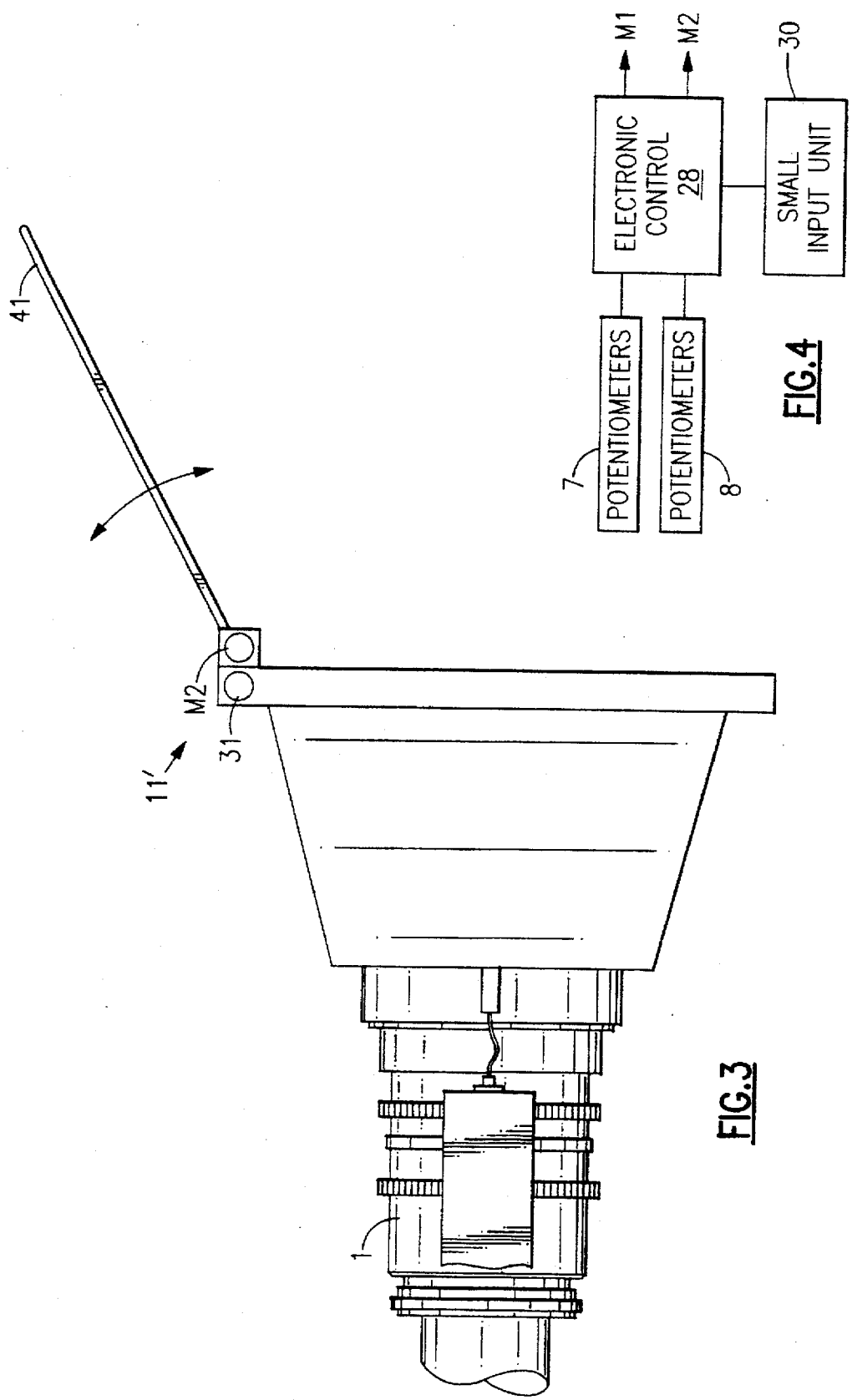
FIG. 3 is a side view of a lens having a modified gobo according to the invention.
FIG. 4 is a schematic block diagram of an electronic control for the gobo.

For driving the bevel gears 25 and 26, and therewith the rollers 20 and 22, a motor M1, which is electrically governed by an electronic control 28, is provided, see FIG. 4. The electronic control 28 receives, from the respective potentiometers 7 and 8, control signals concerning the actual settings of the focal length and of the focus and processes them into control signals for the motor M1, accordingly controlling them so that the free aperture 27 of the gobo 11 is exactly adapted to the actual image field of the lens, depending on the focal length to be used.

Either the energy supply already existing for the camera or a special energy supply 29 such as a small battery, which is removably retained in the frame 14 of the gobo 11, can be used for the energy supply of the motor M1. The electronic control 28 can be programmed, via a small input unit 30, so that the gobo 11 can be programmed, for instance, to the image format used at the time.

A handwheel 31, connected with the bevel gear 25, is also provided for manual adjustment of the gobo 11.

The picture ratio of the free aperture 27 of the gobo 11 is changed, depending on the focal length used, by replacement of the bevel gears 25 and 26 with bevel gears of another gear ratio. Alternatively, it is possible to use a motor for each of the two axles 23 and 24, and then accordingly control the second motor via the electronic control 28.

In FIG. 3, a lens 1 is provided with a modified gobo 11. The gobo 11 is built as shown in FIG. 1, but a diaphragm shutter 41, which can swivel about a horizontal axis by means of a motor M2, only diagrammatically indicated, is additionally provided on the upper edge of gobo 11. Said motor M2 is also actuated by the electronic control 28.

Even though in the foregoing the curtains of the gobo 11 were substantially adjusted in one plane, it is also evidently possible to move them along a convex surface, such as a cylindrical surface, or to adjust adequately the sidewalls of the gobo 11 so that, depending on the focal length used, a free aperture 27 of the gobo 11 which lies in a more or less convex surface results.

I claim:

1. A gobo, for screening and framing a field of view of a lens of one of a film camera and video camera to prevent light incident from light sources outside of the field of view from entering the lens and creating ghost images, the field of view being defined by a focal length of the lens, the lens having a front surface opposite a focal plane of the lens, the gobo comprising:

a diaphragm mask spaced a fixed distance from the front surface of the lens;

a free aperture provided in the diaphragm mask, positioned along an optical axis of the lens, having an adjustable size, and lying substantially in a plane perpendicular to the optical axis;

an adjusting device provided for adjusting the size of the free aperture such that the field of view of the lens is screened, wherein the size of the free aperture is determined by the focal length of the lens;

said adjusting device receives an input signal that defines the field of view of the camera lens and derives therefrom adjusting signals for the size of the aperture; and a roller and belt drive arrangement (19–26) is provided for adjusting said free aperture of said diaphragm mask.

2. A gobo, for screening and framing a field of view of a lens of one of a film camera and video camera to prevent light incident from light sources outside of the field of view from entering the lens and creating ghost images, the field of view being defined by a focal length of the lens, the lens having a front surface opposite a focal plane of the lens, the gobo comprising:

a diaphragm mask spaced a fixed distance from the front surface of the lens;

a free aperture provided in the diaphragm mask positioned along an optical axis of the lens, having an adjustable size, and lying substantially in a plane perpendicular to the optical axis; and an adjusting device provided for adjusting the size of the free aperture such that the field of view of the lens is screened, wherein the size of the free aperture is determined by the focal length of the lens; and said adjusting device comprises a roller and belt drive arrangement (19–26) for adjusting the size of said free aperture and a handwheel is connected to an axis of said roller and belt arrangement.

3. A gobo, for screening and framing a field of view of a lens of one of a film camera and video camera to prevent light incident from light sources outside of the field of view from entering the lens and creating ghost images, the field of view being defined by a focal length of the lens, the lens having a front surface opposite a focal plane of the lens, the gobo comprising:

a diaphragm mask spaced a fixed distance from the front surface of the lens;

a free aperture provided in the diaphragm mask, positioned along an optical axis of the lens, having an adjustable size, and lying substantially in a plane perpendicular to the optical axis;

an adjusting device is provided for adjusting the size of the free aperture such that the field of view of the lens is screened, wherein the size of the free aperture is determined by the focal length of the lens; and a pair of two horizontally adjustable curtains and a pair of two vertically adjustable curtains (15, 16) are provided, and adjustment of each said pair of adjustable curtains causes said adjustable curtains (15, 16) of each said pair of adjustable curtains to move in opposite directions.

4. A gobo according to claim 3, wherein said diaphragm mask of said gobo is substantially a flat mask.

5. A gobo according to claim 3, wherein said adjusting device receives an input signal that corresponds to the field of view of the camera lens and derives therefrom adjusting signals for the size of the aperture.

6. A gobo according to claim 5, wherein said diaphragm mask (13) has a plurality of movable curtains (15, 16).

7. A gobo according to claim 6, wherein said curtains (15, 16) are flat bellows.

8. A gobo according to claim 6, wherein said curtains are window shades.

9. A gobo according to claim 5, wherein said adjusting device (19–31, M1, M2) comprises at least one electromotor (M1, M2) for adjusting said diaphragm mask (13).

10. A gobo according to claim 9, wherein an electric control (28) is provided for controlling movement of said at least one electromotor (M1, M2).

11. A gobo according to claim 10, wherein said electric control (28) is connected to sensors (7, 8) which determine adjustment of said focal length and focus of said lens.

12. A gobo according to claim 10, wherein said electric control (28) includes an input unit (30) for programming the control of said at least one electromotor (M1, M2).

* * * * *